United States Patent [19]

Maeda et al.

[11] 4,101,817
[45] Jul. 18, 1978

[54] POSITION-CORRECTABLE NUMERICAL CONTROL SYSTEM

[75] Inventors: Yutaka Maeda; Mitsuhiro Kawabe, both of Aichi, Japan

[73] Assignee: Okuma Machinery Works Ltd., Nagoya, Japan

[21] Appl. No.: 702,950

[22] Filed: Jul. 6, 1976

[51] Int. Cl.² ............................................. G05B 19/28
[52] U.S. Cl. ..................................... 318/603; 318/632
[58] Field of Search ................. 318/603, 632, 602; 235/151.11

[56] References Cited

U.S. PATENT DOCUMENTS

| | | | |
|---|---|---|---|
| 3,781,629 | 12/1973 | Yashimoto et al. | 318/632 |
| 3,896,361 | 7/1975 | Inaba et al. | 318/632 X |
| 3,911,347 | 10/1975 | Hartung | 318/632 |

Primary Examiner—B. Dobeck
Attorney, Agent, or Firm—Jay L. Chaskin

[57] ABSTRACT

In a position-correctable numerical control system for machines without any device for detecting the absolute position of an object to be controlled, a plurality of equidistantly-spaced reference marks providing standard ranges of control of the object are determined by a reference mark detection pulse generator. Reference positions corresponding to the reference marks are stored in advance in a non-volatile memory. The actual position of the object is compared with a reference position stored in said non-volatile memory, each time the object to be controlled passes each of the reference marks, so that the actual position of the object is corrected in accordance with a difference, if any, between the actual position and the reference position.

4 Claims, 7 Drawing Figures

POSITION-CORRECTABLE NUMERICAL CONTROL SYSTEM

BACKGROUND OF THE INVENTION

1. Field of the Invention

This invention relates to a numerical control system capable of correcting the position of an object, or more in particular to a numerical control system which, examining all the time the position of a work table or other object without any absolute position detector, produces a correction or alarm signal in the case of a deviation from a standard or reference position.

2. Description of the Prior Art

Conventional numerical control systems without any absolute position detector, such as a feed-back system using pulse counts and an open loop system driven by a pulse motor have the following disadvantages:

(1) When the power supply is cut off, the current position of a work table or other object of a machine tool or industrial machine to be controlled is missed, and therefore it is necessary to reset the reference position after the power supply is restored. For this purpose, a reference position is required to be set at a point on the control axis and an origin must be restored in order to enable reactuation from that particular reference position.

(2) In the case where the machine fails to follow command pulses due to a mechanical trouble or electrical malfunction, errors in the position of a working table or like object accumulate. If these errors are to be detected during the machine operation, a special device is required. Since this is usually difficult, it is common practice to identify the degree of errors by examining the precision of a work piece involved.

SUMMARY OF THE INVENTION

In order to obviate the above-mentioned disadvantages of the conventional systems, the system according to the present invention is comprised of a reference mark detection pulse generator for determining reference marks at intervals (usually, regular intervals) making up reference positions over the entire control axis range. Reference positions after determining a working origin, corresponding to respective reference marks determined by the reference mark detection pulse generator are stored in a non-volatile memory. Each time a work table or other movable part of a machine tool passes each of the reference marks, the actual position of the table at that instant is compared with corresponding reference position stored in the non-volatile memory. If they are not coincident, an error-correction signal or an alarm signal is produced, thus preventing the accumulation of errors in the movement of the table.

DESCRIPTION OF THE PREFERRED EMBODIMENTS

Figure 1:
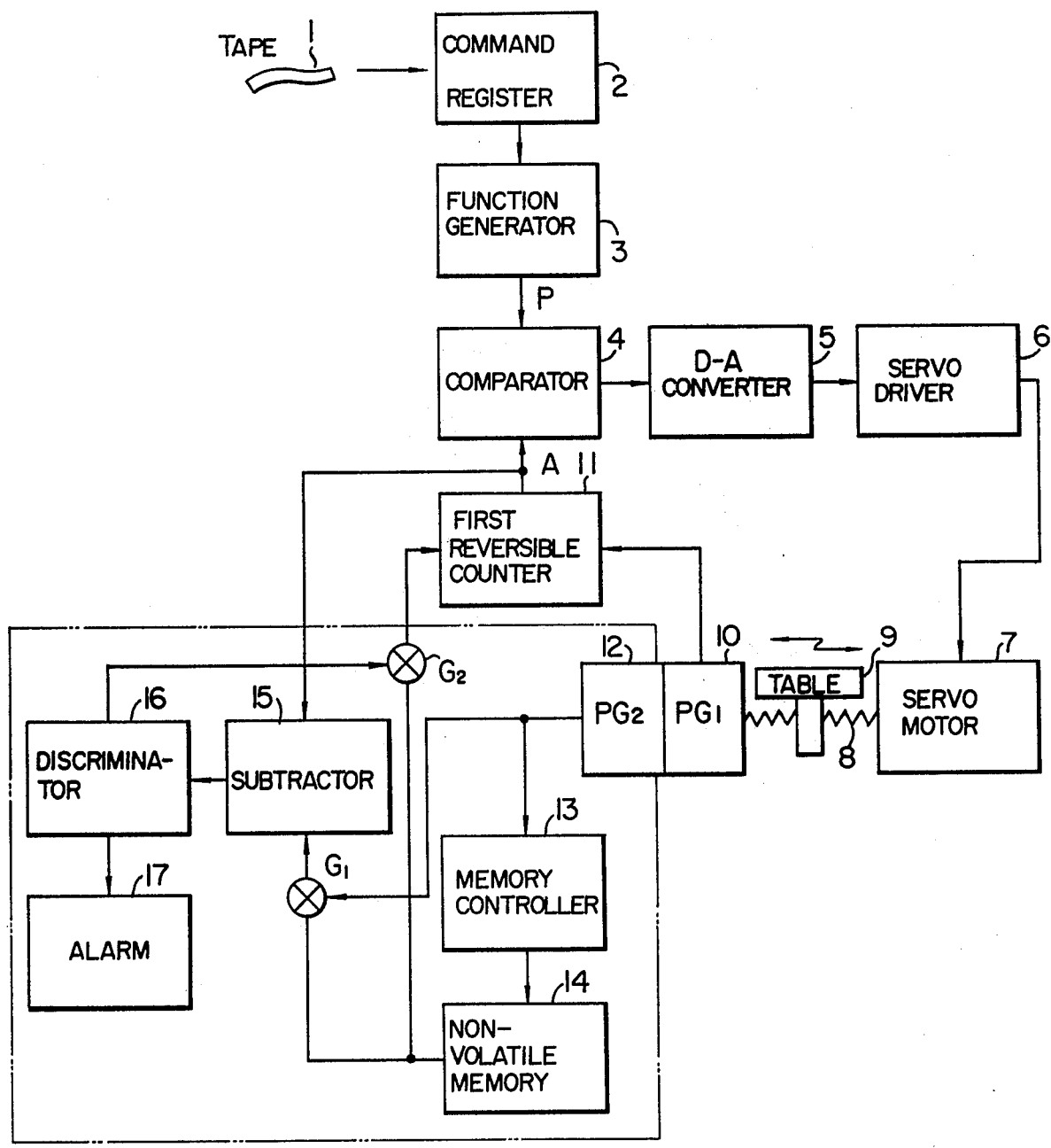
FIG. 1 is a block diagram showing an embodiment of the present invention with a non-volatile memory of large capacity, as applied to a pulse count closed-loop system.

An embodiment of the invention as applied to a pulse count closed-loop system is shown in the block diagram of FIG. 1, and includes a non-volatile memory of large capacity. In the drawing, reference numeral 1 shows an input tape, numeral 2 a command register for setting a target position of the table 9, and numeral 3 a function generator for generating a function P on the basis of the target position set by the command register 2. Numeral 4 shows a comparator whereby the output P of the function generator 3 is kept compared with a value A representing the current position of the table 9. The resulting difference is applied to a D-A converter 5, where it is converted into an analog voltage. This analog voltage is applied to a servo driver 6, thereby driving the servo-motor 7. The table 9 is moved through a feed screw 8. A moving amount detection pulse generator 10 (hereinafter referred to as $PG_1$) is coupled directly to the feed screw 8 and produces pulses in the number proportional to the amount of travel of the table. These pulses are accumulated in a first reversible counter 11 wherefrom the numerical value A representing the current position of the table 9 is produced.

A conventional pulse count closed-loop control system was explained above.

Figure 5:
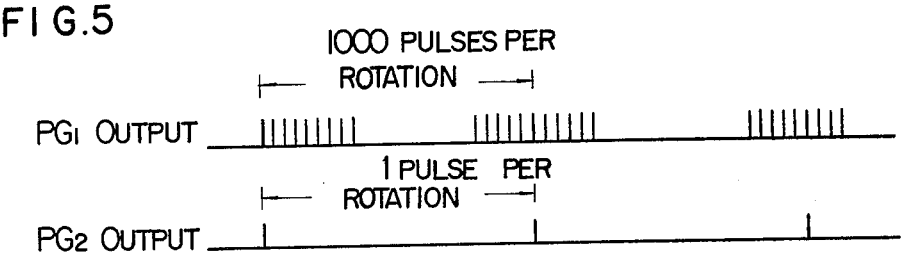
FIG. 5 is a diagram showing the relation between the output of a moving amount detection pulse generator $PG_1$ and the output of a reference mark detection pulse generator $PG_2$.
Figure 6:
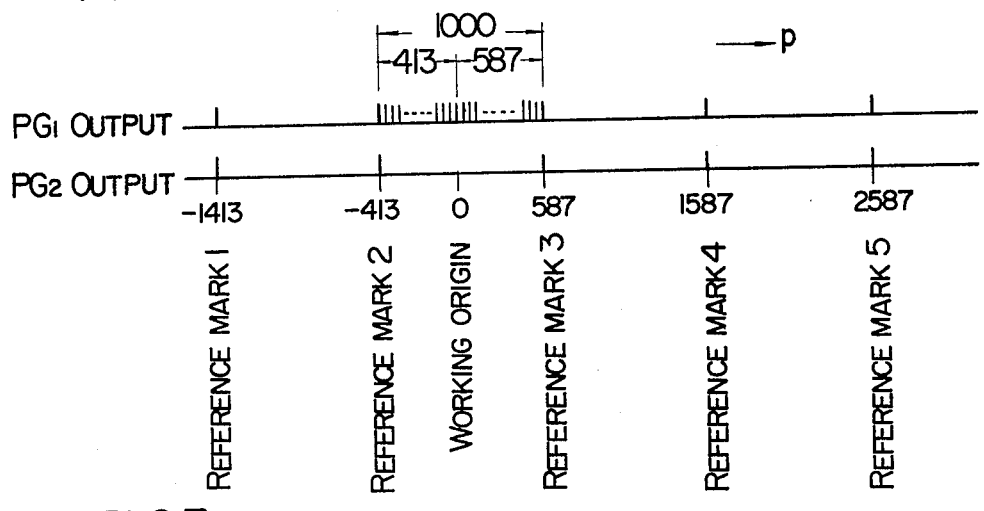
FIG. 6 is a diagram for explaining the manner in which an origin offset value is restored in the case where a non-volatile memory of large capacity is involved.

In order to obviate the above-mentioned disadvantages of the conventional system, the system according to the invention is provided with a second reference mark detection pulse generator (hereinafter referred to as $PG_2$) for determining reference marks over the entire controlled range of movement of the table 9. In the embodiment under consideration, the generator $PG_2$ is axially coupled to the generator $PG_1$ in such a way that the generator $PG_2$ produces one pulse for every rotation of the generator $PG_1$. The outputs of the generators $PG_1$ and $PG_2$ have the relation as shown in FIG. 5. Now, assume that each output pulse of the generator $PG_1$ corresponds to a table movement of 0.01 mm and that the generator $PG_1$ is so set as to produce 1000 pulses for each rotation. For each rotation of the generator $PG_1$, the table 9 moves 10 mm, which causes a reference mark pulse to be generated from the generator $PG_2$. The actual machine operation requires a working origin to be set, which makes up an origin for programming. Also assume that, as shown in FIG. 6, a working origin is set between the reference marks 2 and 3 at a point with the distance of 413 pulses from the reference mark 2 and 587 pulses from the reference mark 3. The position of the reference mark 1 is represented as −1413, the reference mark 2 as −413, the reference mark 3 as 587, the reference mark 4 as 1587 and the reference mark 5 as 2587. Turning again to FIG. 1, these values of the respective reference marks are stored in the non-volatile memory 14. In response to the generation of a reference mark pulse in the generator $PG_2$, a memory controller 13 is energized, so that a correct value corresponding to that reference mark is read out of the non-volatile memory 14 and applied to the subtractor 15 via a gate $G_1$ operated by the reference mark pulse. The output pulses from the generator $PG_1$, on the other hand, are accumulated in the first reversible counter 11 to indicate the numerical value A representing the current position of the table 9. The numerical value A associated with the current position is applied to the subtractor 15. In the subtractor 15, the value produced from the reversible counter 11 is compared with the value read out of the non-volatile memory in response to the reference mark pulse. When they coincide with each other, it means that the outputs of the generator $PG_1$ are counted normally and no output is produced from the discriminator 16. When they fail to coincide with each other, by contrast, it means that the output pulses of the generator $PG_1$ are counted erroneously due to an external disturbance or other causes. In this case, the discriminator 16 energizes the alarm 17 on the one hand and opens the gate $G_2$ on the other thereby to apply to the first reversible counter 11 the correct value stored in the non-volatile memory 14. Thus the erroneous counts are corrected. As a result, any errors which may occur by miscounting are corrected and prevented from being accumulated at each reference mark. In this way, each time a reference mark is passed, the information stored in the first reversible counter 11 is compared with the correct value stored in the non-volatile memory 14 for the purpose of regulation. In view of the fact that the reference marks set for the entire range of regulation are stored in the non-volatile memory as absolute positions, the non-volatile memory 14 is required to have a sufficiently large memory capacity. In the foregoing description, the value corresponding to each reference mark includes no pitch error of the feed screw. Such an error may of course be also included in the value corresponding to each reference mark and corrected at the same time. Further, although the embodiment under consideration involves reference marks spaced at regular intervals, they need not necessarily be regularly spaced if a plurality of generators equivalent to the generator $PG_2$ are provided to determine the reference marks.

Figure 2:
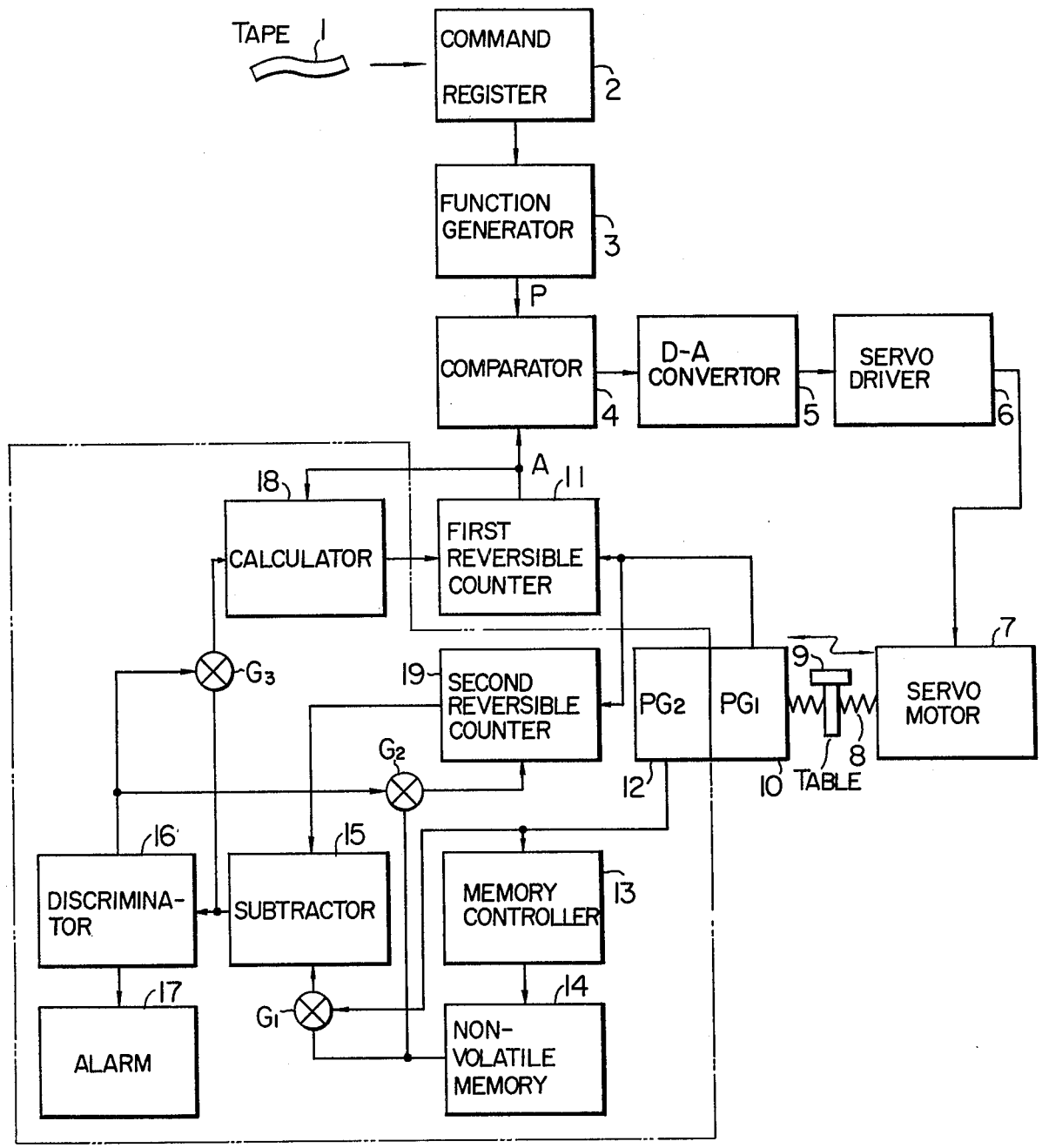
FIG. 2 is a block diagram showing another embodiment of the present invention with a non-volatile memory of small capacity, as applied to a pulse count closed-loop system.
Figure 7:
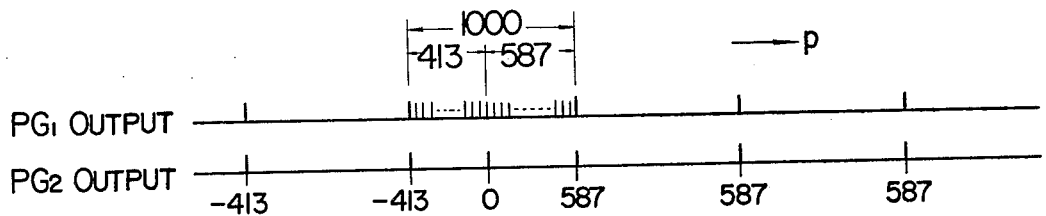
FIG. 7 is a diagram for explaining the manner in which an origin offset value is restored in the case where a non-volatile memory of small capacity is involved.

A second embodiment of the invention usable with a non-volatile memory of small capacity will be explained with reference to FIG. 2. The embodiment shown in FIG. 2 is different from the first embodiment in that, in addition to the first reversible counter 11, a second reversible counter 19 with a smaller memory capacity is provided on one hand and the capacity of the non-volatile memory 14 is reduced on the other. The circuit is further provided with a calculator 18, which processes the value produced from the first reversible counter 11 and the result of the subtraction made in the subtractor 15 through the gate $G_3$ opened in response to signal from the discriminator 16. The output of the calculator 18 is applied to the first reversible counter 11, while the value read out of the non-volatile memory 14 is applied to the second reversible counter 19 in response to a signal from the discriminator 16. The newly-added second reversible counter 19 functions to count pulses of each section from one to another of the equidistantly-spaced reference marks, and operates in such a manner that when 0 to 999 pulses are counted for a rotation of the generator $PG_1$, for example, the count is restarted from 1 after 1000. If a working origin offset value is set as shown in FIG. 7, the positions of the reference marks 1 and 2 are represented by the pulse −413, the positions of reference marks 3, 4 and 5 by the pulse 587, so that the pulses −413 and 587 are stored in the non-volatile memory 14. Now, assume that the table begins to move in the direction P from the working origin. Both the first reversible counter 11 and the second reversible counter 19 begins to count from 0. When the reference mark 3 is passed, both the first reversible counter 11 and the second reversible counter 19 register 587. When the reference mark 4 is passed, by contrast, the first reversible counter 11 and the second reversible counter 19 register 1587 and 587 respectively. Each time a reference mark is passed, the information stored in the second reversible counter 19 is compared with 587 in the non-volatile memory 14. When they fail to coincide with each other, it means that the output pulses of the generator $PG_1$ are miscounted. The result is that in response to the signal from the discriminator 16, the information stored in the first reversible counter 11 is corrected by the output of the calculator 18 being a difference between said information stored in said first reversible counter 11 and the output of the subtractor 15, whereas the information stored in the second reversible counter 19 is corrected by the value read out of the non-volatile memory 14. Further, in the case where the error is greater than a predetermined value, an alarm is issued thereby to stop the movement of the table 9.

Next, a third embodiment employing the pulse motor drive open-loop system and having a non-volatile memory of comparatively large capacity will be explained with reference to FIG. 3. As compared with the embodiments of FIGS. 1 and 2, this embodiment has a different type of table drive system. The function generator 3' produces output pulses P in the number required for driving the table 9. Although an $OR_1$ gate is added to assure satisfactory functions of the circuit, the pulse motor driver 6' is functionally equivalent to the servo motor 6, while the pulse motor 7' is the equivalent of the servo motor 7 in the preceding embodiments. The part surrounded by a two-point chain represents the functions of the present invention. Except for a third reversible counter 20, a correction pulse command generator 21 and a subtractor 22 all of which are newly added, like component elements are denoted by like reference numerals in FIG. 1. The third reversible counter 20 produces an output representing a calculated command value, and the first reversible counter 11 the current value based on feedback pulses. The input to the correction pulse command generator 21 is derived from the difference between the outputs of the first and third reversible counters, through the gate $G_4$ operated by the output of the discriminator 16. A correction output of the correction pulse command generator 21 corresponding to the input thereto is applied to the OR gate $OR_1$.

When the table 9 passes the reference mark 3, for example, it is assumed that while the first reversible counter 11 and the non-volatile memory 14 register 587, the calculation value 589 is already stored in the third reversible counter 20. In operation, command pulses are issued from the function generator 3'. These pulses are accumulated in the third reversible counter 20 on one hand and applied via the OR gate $OR_1$ and the pulse motor driver 6' to the pulse motor 7'. The movement of the table 9 in response to the command pulses, on the other hand, is read by the first reversible counter 11 through the feed screw 8 and the generator $PG_1$. When the table 9 passes a reference mark under these conditions, it is already mentioned that the values stored in the first reversible counter 11 and the non-volatile memory 14 stand at 587. These values are compared in the subtractor 15 and the difference is applied to the discriminator 16. Since the output of the subtractor 15 stands at zero, no output is produced from the discriminator 16. In the meantime, the output of the third reversible counter 20 is continually compared with that of the first reversible counter 11 by the subtractor 22. The output of the subtractor 22 is applied to the discriminator 16, so that the difference between the input signals to the subtractor 22 is corrected by the correction pulse command generator 21. Since the counters 20 and 11 stand at 589 and 587 respectively at the time of passage of the reference mark 3, as mentioned above, the discriminator 16 operates in such a manner as to open the gate $G_4$ on the basis of the output of the subtractor 22, with the result that the correction pulse command generator 21 is energized to drive the pulse motor 7' by two pulses as a difference signal.

The foregoing description is concerned with an example of correction in the case of mechanical trouble, and it may be that, in view of the construction of the invention including the generator $PG_1$, an electrical trouble may occur due to an external disturbance. As described in connection with the pulse count closed-loop system based on FIG. 1, in the case of electrical trhouble, the output values of the non-volatile memory 14 and the first reversible counter 11 are compared by the subtractor 15 when the table 9 passes a reference mark. If the discriminator 16 decides that there is a difference therebetween, the value stored in the non-volatile memory 14 is transferred to the first reversible counter 11 through the gate $G_2$.

A fourth embodiment using a non-volatile memory similar to but smaller in capacity than the memory in FIG. 3 will be explained with reference to FIG. 4.

Figure 3:
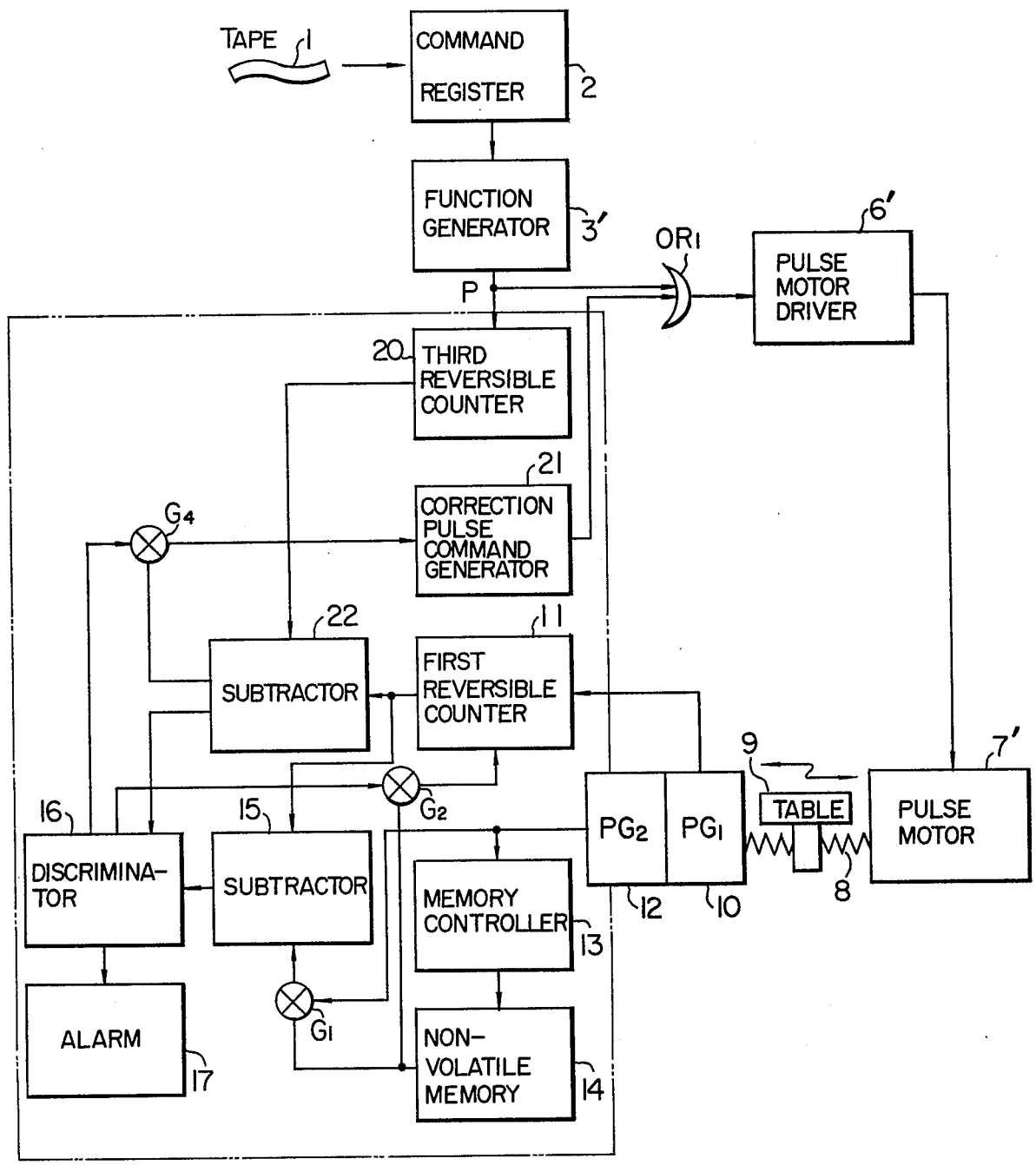
FIG. 3 is a block diagram showing still another embodiment of the present invention with a non-volatile memory of large capacity, as applied to a pulse motor powered open loop system.
Figure 4:
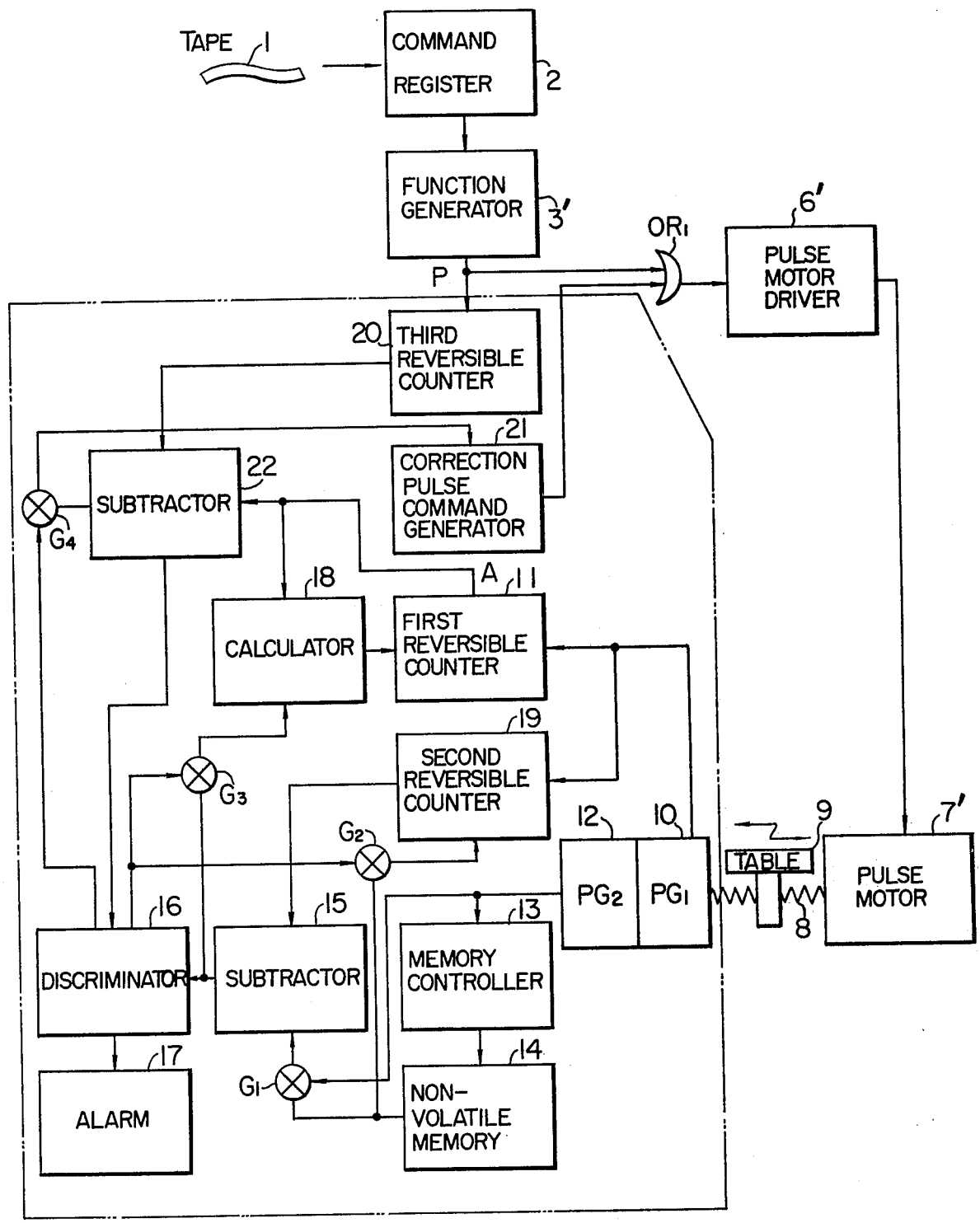
FIG. 4 is a block diagram showing a further embodiment of the present invention with a non-volatile memory of small capacity, as applied to a pulse motor powered open loop system.

This embodiment includes a pulse motor powered open-loop system involving a smaller memory capacity of the non-volatile memory, and therefore is obviously obtained by combining the embodiments of FIGS. 3 and 2. The circuit of FIG. 4 has accordingly a combined function of those of FIGS. 3 and 2 and the construction and the operation thereof will not be described here.

As explained in detail above, it is possible for the present invention to practically eliminate accumulated errors attributable to machine-derived errors and miscounting of feedback pulses and the resulting substandard machining operation which constitute the disadvantages of the conventional numerical control system without any absolute position detector. Further, it is not necessary to return to the origin for restarting at the time of power restoration after power cut-off. In other words, the value of the reference mark immediately before the stoppage of the machine is stored in the non-volatile memory. Assuming that the machine had been moving in the direction P immediately before stoppage, the stopped machine is deliberately moved to a reference mark in the direction P, so that by storing the value of that particular reference mark passed in the reversible counter, it is possible to identify the position of the machine. The machine is capable of being restarted at that position, thereby simplifying and shortening the time required for the machine operation as compared with the conventional systems.

Furthermore, depending on the speed of the table at the time of power cut-off, the overrunning amount of the table due to inertia is naturally determined by the mechanical system. Though not shown in the block diagram, the output pulses of the generator $PG_1$ are counted at the time of power cut-off. The moving speed of the table obtained from the command value register 2 and the information stored in the reversible counter are stored in the non-volatile memory. After the power supply is reconnected, whether or not a reference mark is passed by the table moving by inertial is easily determined from the distance from the restart point to the nearest reference mark reached.

As described above, the present invention eliminates the shortcomings of the conventional systems which result from the cut off of power.

In the case of FIGS. 1 and 3 where a large capacity of the non-volatile memory is involved, still another advantage of the invention is that a pitch error of the feed screw is also corrected by correcting the position corresponding to each or a given reference mark in advance, by the amount of the pitch error of the feed screw.

We claim:

1. A position-correctable numerical control system for a machine wherein the position of an object along a path of travel is to be controlled without any device for detecting the absolute position of said object, said system comprising a reference mark detection pulse generator for determining a plurality of equidistantly-spaced reference marks providing standard ranges of control over the path of travel of said object, a non-volatile memory for storing in advance reference positions over the path of travel corresponding to said reference marks determined by said reference mark detection pulse generator, a comparator for comparing the actual position of said object on said path with a reference position stored in said non-volatile memory each time said object passes one of said reference marks, and means for correcting the position of said object on said path in accordance with a difference, if any, between said actual position and said reference position, so that the position of said object on said path is corrected each time it passes one of said reference marks.

2. A position-correctable numerical control system according to claim 1, further comprising a moving-amount detection pulse generator, and a first reversible counter for accumulatively counting output pulses from said moving-amount detection pulse generator, said comparator constructed and arranged to compare the value of the reference position stored in said non-volatile memory with the value of counts accumulated in said first reversible counter, said first reversible counter being supplied with said value of said reference position when there is any difference between said value of said reference position and said value of counts accumulated in said first reversible counter thereby correcting said value of accumulated counts.

3. A position-correctable numerical control system according to claim 1, further comprising a first reversible counter for accumulatively counting output pulses from a moving-amount detection pulse generator, a second reversible counter for accumulatively counting said output pulses only for a given section between adjacent reference marks, a calculator, means for comparing the reference position signal stored in said nonvolatile memory with the value of counts accumulated in said second reversible counter, each time of generation of an output pulse from said reference mark detection pulse generator, means for correcting the information stored in said first reversible counter, in accordance with the output of said calculator, and means for correcting the information stored in said second reversible counter, in accordance with the value read out of said non-volatile memory, said output of said calculator being a difference between said information stored in said first reversible counter and a difference, if any, between said reference position in said non-volatile memory and said value of counts accumulated in said second reversible counter.

4. A position-correctable numerical control system according to claim 1, further comprising a third reversible counter for producing calculated command values, a first reversible counter for indicating the position of an object to be controlled, means for comparing the outputs of said first and third reversible counters with each other when said object to be controlled passes a reference mark, and a correction pulse command generator acting as an auxiliary means for driving a pulse motor which, in turn, drives said object in accordance with the result of comparison in said comparator means.

* * * * *